United States Patent
Murayama et al.

(10) Patent No.: US 7,282,279 B2
(45) Date of Patent: Oct. 16, 2007

(54) MAGNETIC RECORDING MEDIUM INCLUDING A RADIATION-CURED MATERIAL LAYER HAVING A SPECIFIED STRUCTURE AND COMPOSITION

(75) Inventors: Yuichiro Murayama, Kanagawa (JP); Hiroshi Hashimoto, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 10/971,121

(22) Filed: Oct. 25, 2004

(65) Prior Publication Data

US 2005/0089721 A1     Apr. 28, 2005

(30) Foreign Application Priority Data

Oct. 27, 2003   (JP)   ............................. 2003-366204

(51) Int. Cl.
*G11B 5/70* (2006.01)
*G11B 5/702* (2006.01)

(52) U.S. Cl. ................. 428/840.5; 428/840.1; 428/842; 428/848.2

(58) Field of Classification Search ............. 428/847.5
See application file for complete search history.

(56) References Cited

U.S. PATENT DOCUMENTS

| | | | | |
|---|---|---|---|---|
| 4,511,629 | A * | 4/1985 | Konno et al. ................ | 428/522 |
| 4,746,558 | A * | 5/1988 | Shimozawa et al. ......... | 428/141 |
| 5,484,661 | A * | 1/1996 | Hashimoto et al. .......... | 428/522 |
| 6,610,426 | B2 * | 8/2003 | Hashimoto et al. ......... | 428/844.6 |
| 7,026,064 | B1 * | 4/2006 | Tsunekawa et al. ........ | 428/847.4 |
| 7,041,395 | B2 * | 5/2006 | Murayama et al. ......... | 428/840.5 |
| 7,169,438 | B2 * | 1/2007 | Tomaru et al. ............. | 427/128 |
| 7,198,817 | B2 * | 4/2007 | Takahashi et al. .......... | 427/127 |
| 2001/0007721 | A1 * | 7/2001 | Zinbo et al. ........... | 428/694 BA |
| 2002/0022130 | A1 * | 2/2002 | Kohl et al. ............ | 428/423.1 |
| 2003/0064252 | A1 * | 4/2003 | Murayama et al. ... | 428/694 BS |
| 2003/0068529 | A1 * | 4/2003 | Ikeda et al. ........... | 428/694 BR |
| 2003/0180578 | A1 * | 9/2003 | Hayakawa et al. .... | 428/694 TS |

FOREIGN PATENT DOCUMENTS

| | | |
|---|---|---|
| JP | 57-40747 A | 3/1982 |
| JP | 58-146023 A | 8/1983 |
| JP | 60-150227 A | 8/1985 |
| JP | 5-57647 B2 | 8/1993 |

* cited by examiner

*Primary Examiner*—Kevin M. Bernatz
(74) *Attorney, Agent, or Firm*—Sughrue Mion Pllc.

(57) ABSTRACT

A magnetic recording medium is provided that includes a non-magnetic support and, in order, above the non-magnetic support, a radiation-cured material layer cured by exposing a layer that includes a radiation curable compound to radiation, and a magnetic layer that includes a fine ferromagnetic powder and a binder, a compound having one or more ether groups and three or more radiation curable functional groups per molecule being employed as the radiation curable compound, and the number of magnetic layer surface micro projections having a height measured by atomic force microscopy (AFM) of 10 to 20 nm being 5 to 1,000 per 100 $(\mu m)^2$. There is also provided the magnetic recording medium wherein it further includes a non-magnetic layer that includes a non-magnetic powder and a binder.

10 Claims, No Drawings

MAGNETIC RECORDING MEDIUM INCLUDING A RADIATION-CURED MATERIAL LAYER HAVING A SPECIFIED STRUCTURE AND COMPOSITION

BACKGROUND OF THE INVENTION

1. Field of the Invention

The present invention relates to a magnetic recording medium such as a magnetic tape or a magnetic disc.

2. Description of the Related Art

As tape-form magnetic recording media for audio, video, and computers, and disc-form magnetic recording media such as flexible discs, a magnetic recording medium has been used in which a magnetic layer having dispersed in a binder a fine ferromagnetic powder such as γ-iron oxide, Co-containing iron oxide, chromium oxide, or a ferromagnetic metal powder is provided on a support. With regard to the support used in the magnetic recording medium, polyethylene terephthalate, polyethylene naphthalate, etc. are generally used. Since these supports are drawn and are highly crystallized, their mechanical strength is high and their solvent resistance is excellent.

The magnetic layer, which is obtained by coating the support with a coating solution having the fine ferromagnetic powder dispersed in the binder, has a high degree of packing of the fine ferromagnetic powder, low elongation at break, and is brittle, and it is therefore easily destroyed by the application of mechanical force and might peel off from the support. In order to prevent this, an undercoat layer is provided on the support so as to make the magnetic layer adhere strongly to the support.

On the other hand, magnetic recording media having a radiation-cured material layer formed using a compound having a functional group that is curable by radiation such as an electron beam, that is, a radiation curable compound, are known (ref. JP-A-57-40747, JP-A-58-146023, JP-A-60-150227, and JP-B-5-57647 (JP-A denotes a Japanese unexamined patent application publication and JP-B denotes a Japanese examined patent application publication)). However, the radiation-cured material layer employing such a radiation curable compound cannot provide sufficient smoothness for the magnetic layer, and adequate electromagnetic conversion characteristics cannot be obtained. Furthermore, since the peel strength of the magnetic layer is not sufficient, when the medium is repeatedly run in a VTR, etc., part of the magnetic layer is peeled off, thus causing faults such as dropouts. Moreover, since the radiation-cured material layer is soft, there is the problem that it often sticks to a path roller, etc. during a coating step, etc.

BRIEF SUMMARY OF THE INVENTION

It is an object of the present invention to provide a magnetic recording medium having excellent smoothness and electromagnetic conversion characteristics, having few faults during web transport in a production process and little loss of the magnetic layer, and for which the productivity is excellent.

The present invention has been accomplished by the following (1) and (2).

(1) A magnetic recording medium comprising a non-magnetic support and, in order, above the non-magnetic support, a radiation-cured material layer cured by exposing a layer comprising a radiation curable compound to radiation, and a magnetic layer comprising a fine ferromagnetic powder and a binder, the radiation curable compound comprising a compound having one or more ether groups and three or more radiation curable functional groups per molecule, and the number of magnetic layer surface micro projections having a height measured by atomic force microscopy (AFM) of 10 to 20 nm being 5 to 1,000 per 100 $(\mu m)^2$.

(2) A magnetic recording medium comprising a non-magnetic support and, in order, above the non-magnetic support, a radiation-cured material layer cured by exposing a layer comprising a radiation curable compound to radiation, a non-magnetic layer comprising a non-magnetic powder and a binder, and a magnetic layer comprising a fine ferromagnetic powder and a binder, the radiation curable compound comprising a compound having one or more ether groups and three or more radiation curable functional groups per molecule, and the number of magnetic layer surface micro projections having a height measured by atomic force microscopy (AFM) of 10 to 20 nm being 5 to 1,000 per 100 $(\mu m)^2$.

In accordance with the present invention, a magnetic recording medium having excellent smoothness and electromagnetic conversion characteristics, having few faults during web transport in a production process and little loss of the magnetic layer, and for which the productivity is excellent, can be obtained.

DETAILED DESCRIPTION OF THE INVENTION

The present invention is explained in detail below.

I. Radiation-Cured Material Layer

<Radiation Curable Compound>

The 'radiation curable compound' contained in the radiation-cured material layer in the present invention means a compound that has the property of starting to polymerize or crosslink on exposure to radiation such as ultraviolet rays or an electron beam and curing to become a macromolecule. The radiation curable compound does not react unless external energy (ultraviolet rays or an electron beam) is applied thereto. Because of this, a coating solution containing the radiation curable compound has a stable viscosity as long as it is not exposed to ultraviolet rays or an electron beam, and high coating smoothness can be obtained. Moreover, since the reaction proceeds instantaneously by virtue of the high energy of the ultraviolet rays or the electron beam, a coating solution containing the radiation curable compound can give high coating strength.

The radiation used in the present invention includes various type of radiation such as an electron beam (β-rays), ultraviolet rays, X-rays, γ-rays, and α-rays.

The radiation curable compound in the present invention has one or more ether groups and three or more radiation curable functional groups per molecule. Such a compound is obtained by a reaction of a dimer, trimer, a tetramer, etc. of a polyhydric alcohol such as pentaerythritol, glycerol, or trimethylolpropane with a compound such as acrylic acid or methacrylic acid that has a radiation curable functional group and a group that reacts with a polyhydric alcohol. It is also possible to react acetic acid, propionic acid, etc. as necessary, thus adjusting the number of radiation curable functional groups in the molecule.

The radiation curable compound in the present invention preferably has no cyclic structure. The 'cyclic structure' referred to here means a benzene ring structure, a hetero ring structure, or a cyclohexane ring structure.

The radiation curable functional group is preferably an ethylenically unsaturated group, and particularly preferably a (meth)acrylic acid residue. It is preferable for there to be 3 or more (meth)acrylic acid residues per molecule, more preferably 3 to 8 (meth)acrylic acid residues, and yet more preferably 4 to 6 (meth)acrylic acid residues. It is preferable if the number of (meth)acrylic acid residues is in the above-mentioned range since there is little unreacted compound and the long-term storage stability improves. Furthermore, an acrylic acid residue (hereinafter, also called 'acrylate') is preferred to a methacrylic acid residue.

The expression "(meth)acrylic acid residue" is an abbreviated expression that means both a methacrylic acid residue structure and an acrylic acid residue structure are possible.

The radiation curable compound has one or more ether groups per molecule, and more preferably 1 to 3 ether groups.

Examples of the compound having one or more ether groups and three or more radiation curable functional groups per molecule that can be preferably used include dipentaerythritol hexaacrylate, propionic acid-modified dipentaerythritol pentaacrylate, propionic acid-modified dipentaerythritol tetraacrylate, propionic acid-modified dipentaerythritol triacrylate, ditrimethylolpropane tetraacrylate, propionic acid-modified ditrimethylolpropane triacrylate, caprolactone-modified dipentaerythritol hexaacrylate, tripentaerythritol octaacrylate, propionic acid-modified tripentaerythritol heptaacrylate, propionic acid-modified tripentaerythritol hexaacrylate, propionic acid-modified tripentaerythritol pentaacrylate, propionic acid-modified tripentaerythritol tetraacrylate, propionic acid-modified tripentaerythritol triacrylate, tetrapentaerythritol decaacrylate, propionic acid-modified tetrapentaerythritol nonaacrylate, propionic acid-modified tetrapentaerythritol octaacrylate, propionic acid-modified tetrapentaerythritol heptaacrylate, propionic acid-modified tetrapentaerythritol hexaacrylate, propionic acid-modified tetrapentaerythritol pentaacrylate, propionic acid-modified tetrapentaerythritol tetraacrylate, and propionic acid-modified tetrapentaerythritol triacrylate.

Furthermore, it is also possible to employ one obtained by reaction of a compound such as acrylic acid or methacrylic acid, which has a radiation curable functional group and a group that can react with a polyhydric alcohol, with a polyether triol, a polyether tetraol, a polyether hexaol, etc. obtained by ring-opening polymerization of propylene oxide or ethylene oxide using glycerol, trimethylolpropane, etc. as a polymerization initiator.

Specific radiation curable compounds (Compounds (A) to (E)) that can be used preferably in the present invention are shown below.

Compound (A)

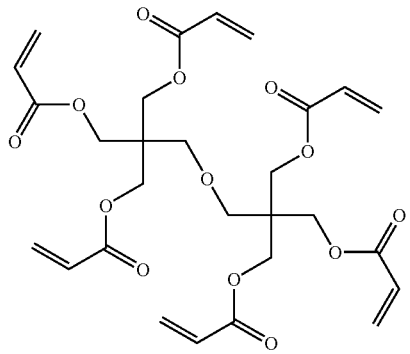

(Dipentaerythritol hexaacrylate)

Compound (B)

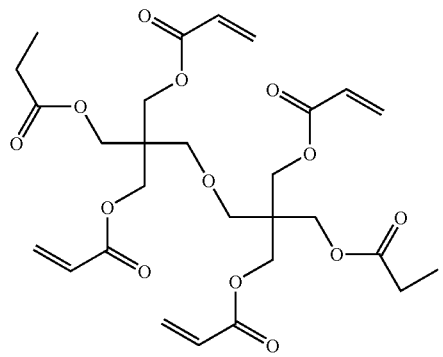

(Propionic acid-modified dipentaerythritol tetraacrylate)

-continued

Compound (C)

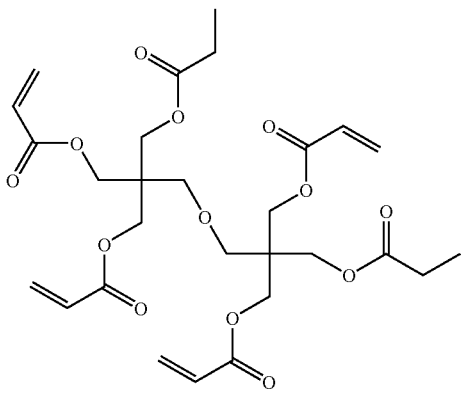

(Propionic acid-modified dipentaerythritol triacrylate)

Compound (D)

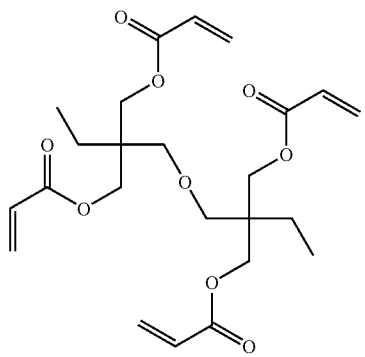

(Ditrimethylolpropane tetraacrylate)

Compound (E)

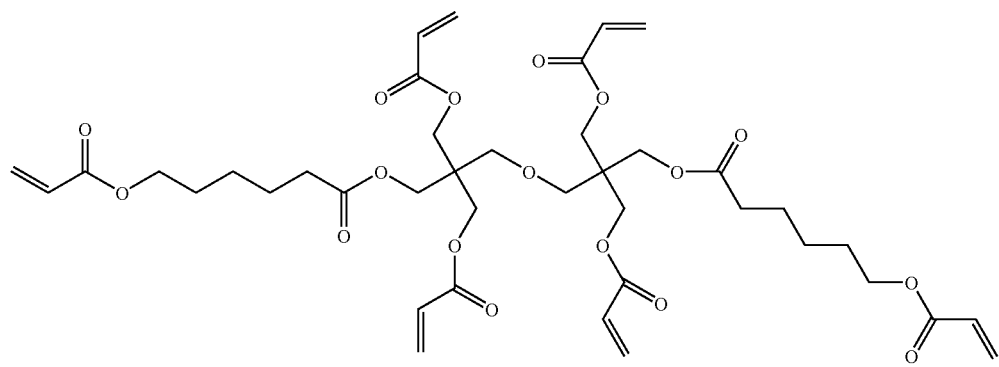

(Caprolactone-modified dipentaerythritol hexaacrylate)

In the present invention, as the radiation curable compound, a monofunctional acrylate or methacrylate compound can be used as a reactive diluent in combination with the above-mentioned compounds. The reactive diluent has the function of adjusting the curing reaction and the physical properties of the radiation-cured material layer. A preferred structure is an acrylate compound having an alicyclic hydrocarbon skeleton. Specific examples thereof include cyclohexyl (meth)acrylate, isobornyl (meth)acrylate, and tetrahydrofurfuryl (meth)acrylate. The content of the reactive diluent is preferably 10 to 100 parts by weight relative to 100 parts by weight of the above-mentioned compound.

The viscosity at 25° C. of the radiation curable compound is preferably 100 to 20,000 mPa·s, and more preferably 300 to 3,000 mPa·s. It is preferable if the viscosity is in this range since the smoothness improves.

The glass transition temperature (Tg) of the radiation-cured material layer after curing is preferably 80° C. to 150° C., and more preferably 100° C. to 130° C. It is preferable if the glass transition temperature is 80° C. to 150° C. since there are few problems with tackiness during a coating step and the strength of a coating increases.

The thickness of the radiation-cured material layer is preferably 0.1 to 1.0 μm, more preferably 0.2 to 0.8 μm, and yet more preferably 0.3 to 0.6 μm. It is preferable if the thickness of the radiation-cured material layer is 0.1 to 1.0 µm since sufficient smoothness can be obtained and the adhesion to a support improves.

The modulus of elasticity of the radiation-cured material layer is preferably 1.5 to 4 GPa. It is preferable if it is in this range since there are few problems with tackiness and a strong coating can be obtained.

In the magnetic recording medium of the present invention, the number of magnetic layer surface micro projections having a height, measured by atomic force microscopy (AFM), of 10 to 20 nm is 5 to 1,000 per 100 $(\mu m)^2$ of the surface of the magnetic layer. By providing the above-mentioned radiation-cured material layer it is possible to control the number of magnetic layer surface projections within the above-mentioned range.

The height measured by atomic force microscopy (AFM) referred to here is defined as the height obtained using as a reference plane a center plane determined by atomic force microscopy (plane for which the volume enclosed by a roughness curve of the magnetic layer surface and the plane is the same above and below the plane and is a minimum).

Therefore, the number of projections having a height of 10 to 20 nm per 100 $(\mu m)^2$ of the surface of the magnetic layer (hereinafter also called the PN) means the density of projections, as the total number per 10 µm square, having a height relative to the reference plane of 10 to 20 nm. The PN is more preferably 5 to 100/100 $(\mu m)^2$. It is preferable if the PN is 5 or higher since the coefficient of friction is low, and it is preferable if the PN is not more than 1,000 since the output is high and the number of dropouts (DO) is small, thereby improving the electromagnetic conversion characteristics.

The radiation used in the present invention may be an electron beam or ultraviolet rays. When ultraviolet rays are used, it is necessary to add a photopolymerization initiator to the radiation curable compound. In the case of curing with an electron beam, no polymerization initiator is required, and the electron beam has a deep penetration depth, which is preferable.

With regard to electron beam accelerators that can be used here, there are a scanning system, a double scanning system, and a curtain beam system, and the curtain beam system is preferable since it is relatively inexpensive and gives a high output. With regard to electron beam characteristics, the acceleration voltage is preferably 30 to 1,000 kV, and more preferably 50 to 300 kV. The absorbed dose is preferably 0.5 to 20 Mrad, and more preferably 2 to 10 Mrad. It is preferable if the acceleration voltage is 30 to 1,000 kV since the amount of energy penetrating is sufficient, and a good energy efficiency is obtained.

The electron beam irradiation atmosphere is preferably controlled by a nitrogen purge so that the concentration of oxygen is 200 ppm or less. It is preferable if the concentration of oxygen is 200 ppm or less since crosslinking and curing reactions in the vicinity of the surface are not inhibited.

As a light source for the ultraviolet rays, a mercury lamp is preferably used. The mercury lamp is a 20 to 240 W/cm lamp and is preferably used at a speed of 0.3 to 20 m/min. The distance between a substrate and the mercury lamp is generally preferably 1 to 30 cm.

As the photopolymerization initiator used for ultraviolet curing, a radical photopolymerization initiator is preferably used. More particularly, those described in, for example, 'Shinkobunshi Jikkenngaku' (New Polymer Experiments), Vol. 2, Chapter 6 Photo/Radiation Polymerization (Published by Kyoritsu Publishing, 1995, Ed. by the Society of Polymer Science, Japan) can be used. Specific examples thereof include acetophenone, benzophenone, anthraquinone, benzoin ethyl ether, benzil methyl ketal, benzil ethyl ketal, benzoin isobutyl ketone, hydroxydimethyl phenyl ketone, 1-hydroxycyclohexyl phenyl ketone, and 2,2-diethoxyacetophenone. The mixing ratio of the aromatic ketone is preferably 0.5 to 20 parts by weight relative to 100 parts by weight of the radiation curable compound, more preferably 2 to 15 parts by weight, and yet more preferably 3 to 10 parts by weight.

With regard to the radiation-curing equipment, conditions, etc., known equipment and conditions described in 'UV•EB Kokagijutsu no Genjyou to Tembou (Present and Prospect of UV/EB Radiation Curing Technology) (2002, published by CMC)', 'Teienerugi Denshisenshosha no Oyogijutsu (Low-energy Electron Beam) (2000, Published by CMC)', etc. can be employed.

II. Magnetic Layer

<Fine Ferromagnetic Powder>

A fine ferromagnetic powder contained in the magnetic layer of the present invention can be either a ferromagnetic metal powder or a ferromagnetic hexagonal ferrite powder.

(Ferromagnetic Metal Powder)

The ferromagnetic metal powder used in the magnetic layer of the present invention is not particularly limited as long as Fe is contained as a main component (including an alloy), and a ferromagnetic alloy powder having α-Fe as a main component is preferable. These ferromagnetic metal powders may contain, apart from the designated atom, atoms such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B. It is preferable for the powder to contain, in addition to α-Fe, at least one chosen from Al, Si, Ca, Y, Ba, La, Nd, Co, Ni, and B, and particularly preferably Co, Al, and Y. More specifically, the Co content is preferably 10 to 40 atom % relative to Fe, the Al content is preferably 2 to 20 atom %, and the Y content is preferably 1 to 15 atom %.

These ferromagnetic metal powders may be treated in advance, prior to dispersion, with a dispersant, a lubricant, a surfactant, an antistatic agent, etc., which will be described later. The ferromagnetic metal powder may contain a small amount of water, a hydroxide, or an oxide.

The water content of the ferromagnetic metal powder is preferably set at 0.01% to 2%. The water content of the ferromagnetic metal powder is preferably optimized according to the type of binder.

The crystallite size is preferably 8 to 20 nm, more preferably 10 to 18 nm, and particularly preferably 12 to 16 nm. The crystallite size is an average value obtained by the Scherrer method from a half-value width of a diffraction peak obtained using an X-ray diffractometer (RINT2000 manufactured by Rigaku Corporation) with a CuKα1 radiation source, a tube voltage of 50 kV, and a tube current of 300 mA.

The length of the major axis of the ferromagnetic metal powder is preferably 10 to 100 nm, more preferably 20 to 90 nm, and particularly preferably 20 to 50 nm. When the magnetic recording medium of the present invention is played back using a magnetoresistive head (MR head), the length of the major axis of the ferromagnetic metal powder is preferably 60 nm or less. The length of the major axis is determined by the combined use of a method in which a transmission electron microscope photograph is taken and the length of the minor axis and the length of the major axis of the ferromagnetic metal powder are measured directly therefrom, and a method in which a transmission electron microscope photograph is traced by an IBASSI image analyzer (manufactured by Carl Zeiss Inc.) and read off.

The specific surface area ($S_{BET}$) obtained by the BET method of the ferromagnetic metal powder used in the magnetic layer of the present invention is preferably 30 to 60 $m^2/g$, and more preferably 38 to 60 $m^2/g$. This enables both good surface properties and low noise to be achieved at the same time. The pH of the ferromagnetic metal powder is preferably optimized according to the binder used in combination therewith. The pH is preferably in the range of 4 to 12, and more preferably from 7 to 10. The ferromagnetic metal powder may be subjected to a surface treatment with Al, Si, P, or an oxide thereof, if necessary. The amount thereof is 0.1 to 10 wt % relative to the ferromagnetic metal powder. The surface treatment preferably suppresses adsorption of a lubricant such as a fatty acid to 100 $mg/m^2$ or less.

The ferromagnetic metal powder may contain soluble inorganic ions such as Na, Ca, Fe, Ni or Sr ions in some cases, and their presence at 200 ppm or less does not particularly affect the characteristics. Furthermore, the ferromagnetic metal powder used in the magnetic layer of the present invention preferably has few pores, and the level thereof is preferably 20 vol % or less, and more preferably 5 vol % or less.

The form of the ferromagnetic metal powder may be any of acicular, granular, rice-grain shaped, and tabular as long as the above-mentioned requirements for the particle size are satisfied, but it is particularly preferable to use an acicular ferromagnetic metal powder. In the case of the acicular ferromagnetic metal powder, the acicular ratio is preferably 4 to 12, and more preferably 5 to 12.

The coercive force (Hc) of the ferromagnetic metal powder is preferably 143 to 255 kA/m (1,800 to 3,200 Oe), and more preferably 159 to 238 kA/m (2,000 to 3,000 Oe). The saturation magnetic flux density is preferably 150 to 300 mT (1,500 to 3,000 G), and more preferably 160 to 290 mT (1,600 to 2,900 G). The saturation magnetization (σs) is preferably 140 to 170 $A \cdot m^2/kg$ (emu/g), and more preferably 145 to 160 $A \cdot m^2/kg$ (emu/g).

The SFD (switching field distribution) of the magnetic substance itself is preferably low, and 0.8 or less is preferred. When the SFD is 0.8 or less, the electromagnetic conversion characteristics become good, the output becomes high, the magnetization reversal becomes sharp with a small peak shift, and it is suitable for high-recording-density digital magnetic recording. In order to narrow the Hc distribution, there is a technique of improving the particle distribution of goethite, a technique of using monodispersed α-$Fe_2O_3$, and a technique of preventing sintering between particles, etc. in the ferromagnetic metal powder.

The ferromagnetic metal powder can be obtained by a known production method and the following methods can be cited. There are a method in which hydrated iron oxide or iron oxide, on which a sintering prevention treatment has been carried out, is reduced with a reducing gas such as hydrogen to give Fe or Fe—Co particles, a method involving reduction with a composite organic acid salt (mainly an oxalate) and a reducing gas such as hydrogen, a method involving thermolysis of a metal carbonyl compound, a method involving reduction by the addition of a reducing agent such as sodium borohydride, a hypophosphite, or hydrazine to an aqueous solution of a ferromagnetic metal, a method in which a fine powder is obtained by vaporizing a metal in an inert gas at low pressure, etc. The ferromagnetic metal powder thus obtained can be subjected to a known slow oxidation process. A method in which hydrated iron oxide or iron oxide is reduced with a reducing gas such as hydrogen, and an oxide film is formed on the surface thereof by controlling the time and the partial pressure and temperature of an oxygen-containing gas and an inert gas is preferable since there is little loss of magnetization.

(Ferromagnetic Hexagonal Ferrite Powder)

Examples of the ferromagnetic hexagonal ferrite powder contained in the magnetic layer of the present invention include substitution products of barium ferrite, strontium ferrite, lead ferrite, and calcium ferrite, and Co substitution products. More specifically, magnetoplumbite type barium ferrite and strontium ferrite, magnetoplumbite type ferrite with a particle surface coated with a spinel, magnetoplumbite type barium ferrite and strontium ferrite partially containing a spinel phase, etc., can be cited. It may contain, in addition to the designated atoms, an atom such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, or Zr. In general, those to which Co—Zn, Co—Ti, Co—Ti—Zr, Co—Ti—Zn, Ni—Ti—Zn, Nb—Zn—Co, Sb—Zn—Co, Nb—Zn, etc. have been added can be used. Characteristic impurities may be included depending on the starting material and the production process.

The average plate size of the ferromagnetic hexagonal ferrite powder is preferably in the range of 5 to 40 nm, more preferably 20 to 35 nm, and yet more preferably 20 to 30 nm. When a magnetoresistive head (MR head) is used for playback in order to increase the track density, the plate size is preferably 40 nm or smaller so as to reduce noise. If the average plate size is in the above-mentioned range, stable magnetization can be expected without the influence of thermal fluctuations.

The tabular ratio (plate size/plate thickness) of the ferromagnetic hexagonal ferrite powder is preferably 1 to 15, and more preferably 1 to 7. If the tabular ratio is small, high packing in the magnetic layer can be obtained, which is preferable, but if it is too small, sufficient orientation cannot be achieved, and it is therefore preferably at least 1. Furthermore, when the tabular ratio is 15 or less, noise can be suppressed by inter-particle stacking. The specific surface area ($S_{BET}$) by the BET method of a powder having a particle size within this range is 10 to 200 $m^2/g$. The specific surface area substantially coincides with the value obtained by calculation using the plate size and the plate thickness. The plate size and plate thickness distributions are preferably as narrow as possible. Although it is difficult, the distribution can be expressed using a numerical value by randomly measuring 500 particles on a TEM photograph of the particles. The distribution is not a regular distribution in many cases, but the standard deviation calculated with respect to the average size is preferably σ/average size=0.1 to 2.0. In order to narrow the particle size distribution, the reaction system used for forming the particles is made as homogeneous as possible, and the particles so formed are subjected to a distribution-improving treatment. For example, a method of selectively dissolving ultrafine particles in an acid solution is also known.

The coercive force (Hc) measured for the ferromagnetic hexagonal ferrite powder can be adjusted so as to be on the order of 39.8 to 398 kA/m (500 to 5,000 Oe). A higher coercive force (Hc) is advantageous for high-density recording, but it is restricted by the capability of the recording head. The coercive force (Hc) in the present invention is on the order of 159 to 239 kA/m (2,000 to 3,000 Oe), and preferably 175 to 223 kA/m (2,200 to 2,800 Oe). When the saturation magnetization of the head exceeds 1.4 T, it is preferably 159 kA/m (2,000 Oe) or higher. The coercive force (Hc) can be controlled by the particle size (plate size, plate thickness), the types and the amount of element included, the element substitution sites, the conditions used for the particle formation reaction, etc. The saturation magnetization (σs) is preferably 40 to 80 A·m$^2$/kg (40 to 80 emu/g). A higher saturation magnetization (σs) is preferable, but there is a tendency for it to become lower when the particles become finer. In order to improve the saturation magnetization (σs), making a composite of magnetoplumbite ferrite with spinel ferrite, selecting the types of element included and their amount, etc., are well known. It is also possible to use a W type hexagonal ferrite in the magnetic layer of the present invention.

When dispersing the ferromagnetic hexagonal ferrite powder, the surface of the magnetic particles can be treated with a material that is compatible with a dispersing medium and a polymer. With regard to a surface-treatment agent, an inorganic or organic compound can be used. Representative examples include compounds of Si, Al, P, etc., and various types of silane coupling agents and various types of titanium coupling agents. The amount thereof added is preferably 0.1% to 10% relative to the ferromagnetic hexagonal ferrite powder. The pH of the ferromagnetic hexagonal ferrite powder is also important for dispersion. It is usually on the order of 4 to 12, and although the optimum value depends on the dispersing medium and the polymer, it is selected from on the order of 6 to 11 from the viewpoints of chemical stability and storage properties of the medium. The moisture contained in the ferromagnetic hexagonal ferrite powder also influences the dispersion. Although the optimum value depends on the dispersing medium and the polymer, 0.01% to 2.0% is normally selected.

With regard to a production method for the ferromagnetic hexagonal ferrite powder, there is glass crystallization method (1) in which barium oxide, iron oxide, a metal oxide that replaces iron, and boron oxide, etc. as glass forming materials are mixed so as to give a desired ferrite composition, then melted and rapidly cooled to give an amorphous substance, subsequently reheated, then washed, and ground to give a barium ferrite crystal powder; hydrothermal reaction method (2) in which a barium ferrite composition metal salt solution is neutralized with an alkali, and after a by-product is removed, it is heated in a liquid phase at 100° C. or higher, then washed, dried and ground to give a barium ferrite crystal powder; co-precipitation method (3) in which a barium ferrite composition metal salt solution is neutralized with an alkali, and after a by-product is removed, it is dried and treated at 1100° C. or less, and ground to give a barium ferrite crystal powder, etc., but the production method for the ferromagnetic hexagonal ferrite powder of the present invention is not particularly limited and any production method can be used. The ferromagnetic hexagonal ferrite powder can be subjected if necessary to a surface treatment with Al, Si, P, an oxide thereof, etc. The amount thereof is preferably 0.1% to 10% based on the ferromagnetic hexagonal ferrite powder, and it is preferable if the surface treatment reduces the adsorption of a lubricant such as a fatty acid to 100 mg/m$^2$ or less. The ferromagnetic hexagonal ferrite powder may contain soluble inorganic ions such as Na, Ca, Fe, Ni or Sr ions in some cases. It is preferable for the soluble inorganic ions to be substantially absent, but their presence at 200 ppm or less does not particularly affect the characteristics.

<Binder>

Examples of a binder used in the magnetic layer include a polyurethane resin, a polyester resin, a polyamide resin, a vinyl chloride resin, an acrylic resin obtained by copolymerization of styrene, acrylonitrile, methyl methacrylate, etc., a cellulose resin such as nitrocellulose, an epoxy resin, a phenoxy resin, and a polyvinyl alkylal resin such as polyvinyl acetal or polyvinyl butyral, and they can be used singly or in a combination of two or more types. Among these, the polyurethane resin, the acrylic resin, the cellulose resin, and the vinyl chloride resin are preferable.

In order to improve the dispersibility of the magnetic powder and the non-magnetic powder, the binder preferably has a functional group (polar group) that is adsorbed on the surface of the powders. Preferred examples of the functional group include —SO$_3$M, —SO$_4$M, —PO(OM)$_2$, —OPO(OM)$_2$, —COOM, >NSO$_3$M, >NRSO$_3$M, —NR$^1$R$^2$, and —N$^+$R$^1$R$^2$R$^3$X$^-$. M denotes a hydrogen atom or an alkali metal such as Na or K, R denotes an alkylene group, R$^1$, R$^2$, and R$^3$ denote alkyl groups, hydroxyalkyl groups, or hydrogen atoms, and X denotes a halogen such as Cl or Br. The amount of functional group in the binder is preferably 10 to 200 μeq/g, and more preferably 30 to 120 μeq/g. It is preferable if the amount of functional group in the binder is in this range since good dispersibility can be achieved.

The binder preferably includes, in addition to the adsorbing functional group, a functional group having an active hydrogen, such as an —OH group, in order to improve the coating strength by reacting with an isocyanate curing agent so as to form a crosslinked structure. A preferred amount is 0.1 to 2 meq/g.

The molecular weight of the binder is preferably 10,000 to 200,000 as a weight-average molecular weight, and more preferably 20,000 to 100,000. It is preferable if it is in this range since the coating strength increases, the durability improves, and the dispersibility is good.

The polyurethane resin, which is a preferred binder, is described in detail in, for example, 'Poriuretan Jushi Handobukku' (Polyurethane Resin Handbook) (Ed., K. Iwata, 1986, The Nikkan Kogyo Shimbun, Ltd.), and it is normally obtained by addition-polymerization of a long chain diol, a short chain diol (also known as a chain extending agent), and a diisocyanate compound. As the long chain diol, a polyester diol, a polyether diol, a polyetherester diol, a polycarbonate diol, a polyolefin diol, etc., having a molecular weight of 500 to 5,000 are used. Depending on the type of this long chain polyol, the polyurethanes are called polyester urethanes, polyether urethanes, polyetherester urethanes, polycarbonate urethanes, etc.

The polyester diol is obtained by a condensation-polymerization between a glycol and a dibasic aliphatic acid such as adipic acid, sebacic acid, or azelaic acid, or a dibasic aromatic acid such as isophthalic acid, orthophthalic acid, terephthalic acid, or naphthalenedicarboxylic acid. Examples of the glycol component include ethylene glycol, 1,2-propylene glycol, 1,3-propanediol, 1,4-butanediol, 1,5-pentanediol, 3-methyl-1,5-pentanediol, 1,6-hexanediol, 2,2-dimethyl-1,3-propanediol, 1,8-octanediol, 1,9-nonanediol, cyclohexanediol, cyclohexane dimethanol, and hydrogenated bisphenol A. As the polyester diol, in addition to the above, a polycaprolactonediol or a polyvalerolactonediol obtained by ring-opening polymerization of a lactone such as ε-caprolactone or γ-valerolactone can be used.

From the viewpoint of resistance to hydrolysis, the polyester diol is preferably one having a branched side chain or one obtained from an aromatic or alicyclic starting material.

Examples of the polyether diol include polyethylene glycol, polypropylene glycol, polytetramethylene glycol, aromatic glycols such as bisphenol A, bisphenol S, bisphenol P, and hydrogenated bisphenol A, and addition-polymerization products from an alicyclic diol and an alkylene oxide such as ethylene oxide or propylene oxide.

These long chain diols can be used as a mixture of a plurality of types thereof.

The short chain diol can be chosen from the compound group that is cited as the glycol component of the above-mentioned polyester diol. Furthermore, a small amount of a tri- or higher-hydric alcohol such as, for example, trimethylolethane, trimethylolpropane, or pentaerythritol can be added, and this gives a polyurethane resin having a branched structure, thus reducing the solution viscosity and increasing the number of OH end groups of the polyurethane so as to improve the curing properties with the isocyanate curing agent.

Examples of the diisocyanate compound include aromatic diisocyanates such as MDI (diphenylmethane diisocyanate), 2,4-TDI (tolylene diisocyanate), 2,6-TDI, 1,5-NDI (naphthalene diisocyanate), TODI (tolidine diisocyanate), p-phenylene diisocyanate, and XDI (xylylene diisocyanate), and aliphatic and alicyclic diisocyanates such as trans-cyclohexane-1,4-diisocyanate, HDI (hexamethylene diisocyanate), IPDI (isophorone diisocyanate), $H_6$XDI (hydrogenated xylylene diisocyanate), and $H_{12}$MDI (hydrogenated diphenylmethane diisocyanate).

The long chain diol/short chain diol/diisocyanate ratio in the--polyurethane resin is preferably (80 to 15 wt %)/(5 to 40 wt %)/(15 to 50 wt %).

The concentration of urethane groups in the polyurethane resin is preferably 1 to 5 meq/g, and more preferably 1.5 to 4.5 meq/g. It is preferable if it is in this range since the mechanical strength is high, and the dispersibility is good.

The glass transition temperature of the polyurethane resin is preferably 0° C. to 200° C., and more preferably 40° C. to 160° C. It is preferable if it is in this range since the durability improves, the calender moldability is enhanced, and as a result the electromagnetic conversion characteristics improve.

With regard to a method for introducing the adsorbing functional group (polar group) into the polyurethane resin, there are, for example, a method in which the functional group is used in a part of the long chain diol monomer, a method in which it is used in a part of the short chain diol, and a method in which, after the polyurethane is formed by polymerization, the polar group is introduced by a polymer reaction.

As the vinyl chloride resin a copolymer of a vinyl chloride monomer and various types of monomer is used.

Examples of the comonomer include fatty acid vinyl esters such as vinyl acetate and vinyl propionate, acrylates and methacrylates such as methyl (meth)acrylate, ethyl (meth)acrylate, isopropyl (meth)acrylate, butyl (meth)acrylate, and benzyl (meth)acrylate, alkyl allyl ethers such as allyl methyl ether, allyl ethyl ether, allyl propyl ether, and allyl butyl ether, and others such as styrene, α-methylstyrene, vinylidene chloride, acrylonitrile, ethylene, butadiene, and acrylamide; examples of a comonomer having a functional group include vinyl alcohol, 2-hydroxyethyl (meth)acrylate, polyethylene glycol (meth)acrylate, 2-hydroxypropyl (meth)acrylate, 3-hydroxypropyl (meth)acrylate, polypropylene glycol (meth)acrylate, 2-hydroxyethyl allyl ether, 2-hydroxypropyl allyl ether, 3-hydroxypropyl allyl ether, p-vinylphenol, maleic acid, maleic anhydride, acrylic acid, methacrylic acid, glydicyl (meth)acrylate, allyl glycidyl ether, phosphoethyl (meth)acrylate, sulfoethyl (meth)acrylate, p-styrenesulfonic acid, and Na salts and K salts thereof.

The proportion of the vinyl chloride monomer in the vinyl chloride resin is preferably 60 to 95 wt %. It is preferable if it is within this range since the mechanical strength improves, the solvent viscosity is stabilized, good solution viscosity can-be obtained, and as a result the dispersibility improves.

A preferred amount of a functional group for improving the curing properties of the adsorbing functional group (polar group) and a polyisocyanate curing agent is as described above. With regard to a method for introducing this functional group, a monomer containing the above-mentioned functional group can be copolymerized, or after the vinyl chloride resin is formed by copolymerization, the functional group can be introduced by a polymer reaction.

A preferred degree of polymerization is 200 to 600, and more preferably 240 to 450. It is preferable if it is in this range, since the mechanical strength is high, the solution viscosity is stable, and the dispersibility is high.

In order to increase the mechanical strength and heat resistance of a coating by crosslinking and curing the binder used in the present invention, it is possible to use a curing agent. A preferred curing agent is a polyisocyanate compound. The polyisocyanate compound is preferably a tri- or higher-functional polyisocyanate.

Specific, examples thereof include adduct type polyisocyanate compounds such as a compound in which 3 moles of TDI (tolylene diisocyanate) are added to 1 mole of trimethylolpropane (TMP), a compound in which 3 moles of HDI (hexamethylene diisocyanate) are added to 1 mole of TMP, a compound in which 3 moles of IPDI (isophorone diisocyanate) are added to 1 mole of TMP, and a compound in which 3 moles of XDI (xylylene diisocyanate) are added to 1 mole of TMP. Furthermore, a condensed isocyanurate type trimer of TDI, a condensed isocyanurate type pentamer of TDI, a condensed isocyanurate heptamer of TDI, mixtures thereof, an isocyanurate type condensation product of HDI, an isocyanurate type condensation product of IPDI, and crude MDI can be cited as examples.

Among these, the compound in which 3 moles of TDI are added to 1 mole of TMP, and the isocyanurate type trimer of TDI are preferable.

Other than the isocyanate curing agents, a curing agent that cures when exposed to an electron beam, ultraviolet rays, etc. can be used. In this case, it is possible to use a curing agent having, as radiation-curing functional groups, two or more, and preferably three or more, acryloyl or methacryloyl groups. Examples thereof include TMP (trimethylolpropane) triacrylate, pentaerythritol tetraacrylate, and a urethane acrylate oligomer. In this case, it is preferable to introduce a (meth)acryloyl group not only to the curing agent but also to the binder. In the case of curing with ultraviolet rays, a photosensitizer is additionally used.

It is preferable to add 0 to 80 parts by weight of the curing agent relative to 100 parts by weight of the binder. It is preferable if it is in this range since good dispersibility can be obtained.

The amount of binder added to the magnetic layer is preferably 5 to 30 parts by weight relative to 100 parts by weight of the fine ferromagnetic powder, and more preferably 10 to 20 parts by weight.

The magnetic layer of the present invention can contain an additive as necessary. Examples of the additive include an abrasive, a lubricant, a dispersant/dispersion adjuvant, a fungicide, an antistatic agent, an antioxidant, a solvent, and carbon black.

Examples of these additives are as follows.

Molybdenum disulfide, tungsten disulfide, graphite, boron nitride, graphite fluoride, a silicone oil, a polar group-containing silicone, a fatty acid-modified silicone, a fluorine-containing silicone, a fluorine-containing alcohol, a fluorine-containing ester, a polyolefin, a polyglycol, a polyphenyl ether; aromatic ring-containing organic phosphonic acids such as phenylphosphonic acid, benzylphosphonic acid, phenethylphosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, tolylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, and nonylphenylphosphonic acid, and alkali metal salts thereof; alkylphosphonic acids such as octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, and isoeicosylphosphonic acid, and alkali metal salts thereof; aromatic phosphates such as phenyl phosphate, benzyl phosphate, phenethyl phosphate, a-methylbenzyl phosphate, 1-methyl-1-phenethyl phosphate, diphenylmethyl phosphate, biphenyl phosphate, benzylphenyl phosphate, α-cumyl phosphate, tolyl phosphate, xylyl phosphate, ethylphenyl phosphate, cumenyl phosphate, propylphenyl phosphate, butylphenyl phosphate, heptylphenyl phosphate, octylphenyl phosphate, and nonylphenyl phosphate, and alkali metal salts thereof; alkyl phosphates such as octyl phosphate, 2-ethylhexyl phosphate, isooctyl phosphate, isononyl phosphate, isodecyl phosphate, isoundecyl phosphate, isododecyl phosphate, isohexadecyl phosphate, isooctadecyl phosphate, and isoeicosyl phosphate, and alkali metal salts thereof; alkyl sulphonates and alkali metal salts thereof; fluorine-containing alkyl sulfates and alkali metal salts thereof; monobasic fatty acids that have 10 to 24 carbons, may contain an unsaturated bond, and may be branched, such as lauric acid, myristic acid, palmitic acid, stearic acid, behenic acid, butyl stearate, oleic acid, linoleic acid, linolenic acid, elaidic acid, and erucic acid, and metal salts thereof; mono-fatty acid esters, di-fatty acid esters, and poly-fatty acid esters such as butyl stearate, octyl stearate, amyl stearate, isooctyl stearate, octyl myristate, butyl laurate, butoxyethyl stearate, anhydrosorbitan monostearate, anhydrosorbitan distearate, and anhydrosorbitan tristearate that are formed from a monobasic fatty acid that has 10 to 24 carbons, may contain an unsaturated bond, and may be branched, and any one of a mono- to hexa-hydric alcohol that has 2 to 22 carbons, may contain an unsaturated bond, and may be branched, an alkoxy alcohol that has 12 to 22 carbons, may have an unsaturated bond, and may be branched, and a mono alkyl ether of an alkylene oxide polymer; fatty acid amides having 2 to 22 carbons; aliphatic amines having 8 to 22 carbons; etc. Other than the above-mentioned hydrocarbon groups, those having an alkyl, aryl, or aralkyl group that is substituted with a group other than a hydrocarbon group, such as a nitro group, F, Cl, Br, or a halogen-containing hydrocarbon such as $CF_3$, $CCl_3$, or $CBr_3$ can also be used.

Furthermore, there are a nonionic surfactant such as an alkylene oxide type, a glycerol type, a glycidol type, or an alkylphenol-ethylene oxide adduct; a cationic surfactant such as a cyclic amine, an ester amide, a quaternary ammonium salt, a hydantoin derivative, a heterocyclic compound, a phosphonium salt, or a sulfonium salt; an anionic surfactant containing an acidic group such as a carboxylic acid, a sulfonic acid, or a sulfate ester group; and an amphoteric surfactant such as an amino acid, an aminosulfonic acid, a sulfate ester or a phosphate ester of an amino alcohol, or an alkylbetaine. Details of these surfactants are described in 'Kaimenkasseizai Binran' (Surfactant Handbook) (published by Sangyo Tosho Publishing).

The dispersant, lubricant, etc. need not always be pure and may contain, in addition to the main component, an impurity such as an isomer, an unreacted material, a by-product, a decomposition product, or an oxide. However, the impurity content is preferably 30 wt % or less, and more preferably 10 wt % or less.

Specific examples of these additives include NAA-102, hardened castor oil fatty acid, NAA-42, Cation SA, Nymeen L-201, Nonion E-208, Anon BF, and Anon LG, (produced by Nippon Oil & Fats Co., Ltd.); FAL-205, and FAL-123 (produced by Takemoto Oil & Fat Co., Ltd), Enujelv OL (produced by New Japan Chemical Co., Ltd.), TA-3 (produced by Shin-Etsu Chemical Industry Co., Ltd.), Armide P (produced by Lion Armour), Duomin TDO (produced by Lion Corporation), BA-41G (produced by The Nisshin Oil Mills, Ltd.), and Profan 2012E, Newpol PE 61, and lonet MS-400 (produced by Sanyo Chemical Industries, Ltd.).

An organic solvent used for the magnetic layer of the present invention can be a known organic solvent. As the organic solvent, a ketone such as acetone, methyl ethyl ketone, methyl isobutyl ketone, diisobutyl ketone, cyclohexanone, or isophorone, an alcohol such as methanol, ethanol, propanol, butanol, isobutyl alcohol, isopropyl alcohol, or methylcyclohexanol, an ester such as methyl acetate, butyl acetate, isobutyl acetate, isopropyl acetate, ethyl lactate, or glycol acetate, a glycol ether such as glycol dimethyl ether, glycol monoethyl ether, or dioxane, an aromatic hydrocarbon such as benzene, toluene, xylene, cresol, or chlorobenzene, a chlorohydrocarbon such as methylene chloride, ethylene chloride, carbon tetrachloride, chloroform, ethylene chlorohydrin, or dichlorobenzene, N,N-dimethylformamide, hexane, tetrahydrofuran, etc. can be used at any ratio.

These organic solvents do not always need to be 100% pure, and may contain an impurity such as an isomer, an unreacted compound, a by-product, a decomposition product, an oxide, or moisture in addition to the main component. The content of these impurities is preferably 30% or less, and more preferably 10% or less. The organic solvent used in the present invention is preferably the same type for both the magnetic layer and the non-magnetic layer. However, the amount added may be varied. The coating stability is improved by using a high surface tension solvent (cyclohexanone, dioxane, etc.) for the non-magnetic layer; more specifically, it is important that the arithmetic mean value of the surface tension of the magnetic layer solvent composition is not less than that for the surface tension of the non-magnetic layer solvent composition. In order to improve the dispersibility, it is preferable for the polarity to be somewhat strong, and the solvent composition preferably contains 50% or more of a solvent having a permittivity of 15 or higher. The solubility parameter is preferably 8 to 11.

The type and the amount of the dispersant, lubricant, and surfactant used in the magnetic layer of the present invention can be changed as necessary in the magnetic layer and the non-magnetic layer, which will be described later. For example, although not limited to only the examples illustrated here, the dispersant has the property of adsorbing or bonding via its polar group, and it is surmised that the dispersant adsorbs or bonds, via the polar group, to mainly the surface of the fine ferromagnetic powder in the magnetic layer and mainly the surface of the non-magnetic powder in the non-magnetic layer, which will be described later, and once adsorbed it is hard to desorb an organophosphorus compound from the surface of metal, a metal compound, etc. Therefore, since in the present invention the surface of the fine ferromagnetic powder or the surface of the non-magnetic powder, which will be described later, are in a state in which they are covered with an alkyl group, an aromatic group, etc., the affinity of the fine ferromagnetic powder or the non-magnetic powder toward the binder resin component increases and, furthermore, the dispersion stability of the fine ferromagnetic powder or the non-magnetic powder is also improved. With regard to the lubricant, since it is present in a free state, its exudation to the surface is controlled by using fatty acids having different melting points for the non-magnetic layer and the magnetic layer or by using esters having different boiling points or polarity. The coating stability can be -improved by regulating the amount of surfactant added, and the lubrication effect can be improved by increasing the amount of lubricant added to the non-magnetic layer. All or a part of the additives used in the present invention may be added to magnetic layer or non-magnetic layer coating solutions at any stage of their preparation. For example, an additive may be blended with a fine ferromagnetic powder before a kneading step; it may be added during a kneading step involving the fine ferromagnetic powder, a binder, and a solvent; it may be added during a dispersing step; it may be added after the dispersing step; or it may be added immediately before coating.

It is possible to add carbon black as necessary to the magnetic layer used in the present invention.

Types of carbon black that can be used include furnace black for rubber, thermal black for rubber, black for coloring, and acetylene black. The carbon black used in the radiation-cured material layer should have characteristics that have been optimized as follows according to a desired effect, and the effect can be increased by the use thereof in combination.

The specific surface area of the carbon black is preferably 100 to 500 m$^2$/g, and more preferably 150 to 400 m$^2$/g, and the oil absorption using dibutyl phthalate (DBP) (DBP oil absorption) is preferably 20 to 400 ml/100 g, and more preferably 30 to 200 ml/100 g. The particle size of the carbon black is preferably 5 to 80 nm, more preferably 10 to 50 nm, and yet more preferably 10 to 40 nm. The pH of the carbon black is preferably 2 to 10, the water content is preferably 0.1% to 10%, and the tap density is preferably 0.1 to 1 g/ml.

Specific examples of the carbon black used in the present invention include BLACKPEARLS 2000, 1300, 1000, 900, 800, 880 and 700, and VULCAN XC-72 (manufactured by Cabot Corporation), #3050B, #3150B, #3250B, #3750B, #3950B, #950, #650B, #970B, #850B, MA600, MA-230, #4000 and #4010 (manufacture by Mitsubishi Chemical Corporation), CONDUCTEX SC, RAVEN 8800, 8000, 7000, 5750, 5250, 3500, 2100, 2000, 1800, 1500, 1255 and 1250 (manufactured by Columbian Carbon Co.), and Ketjen Black EC (manufactured by Akzo Nobel).

The carbon black may be subjected to any of a surface treatment with a dispersant, etc., grafting with a resin, or a partial surface graphitization. The carbon black may also be dispersed in a binder prior to addition to a coating solution. The carbon black that can be used in the present invention can be referred to in, for example, the 'Kabon Burakku Binran' (Carbon Black Handbook) (edited by the Carbon Black Association of Japan).

The carbon black may be used singly or in a combination. When carbon black is used, the amount thereof added is preferably 0.1 to 30 wt % relative to the magnetic substance. The carbon black has the functions of preventing static charging of the magnetic layer, reducing the coefficient of friction, imparting light-shielding properties, and improving the coating strength. Such functions vary depending upon the type of carbon black used. Accordingly, it is of course possible in the present invention to appropriately choose the type, the amount, and the combination of carbon black for the magnetic layer according to the intended purpose on the basis of the above-mentioned various properties such as the particle size, the oil absorption, the electrical conductivity and the pH value, and it is better if they are optimized for the respective layers.

Ill. Non-Magnetic Layer

The magnetic recording medium of the present invention may have a non-magnetic layer comprising a binder and a non-magnetic powder above a non-magnetic support. The non-magnetic powder that can be used in the non-magnetic layer may be an inorganic substance or an organic substance. As the binder resin, additives (abrasive, lubricant, dispersant/dispersion adjuvant, fungicide, antistatic agent, antioxidant, solvent, etc.), dispersing method, etc. for the non-magnetic layer, those for the magnetic layer can be employed. In particular, the amount and type of binder, and the amounts and types of additive and dispersant can be determined according to known techniques regarding the magnetic layer. Furthermore, in addition to the non-magnetic powder, carbon black can be added as necessary to the non-magnetic layer.

(Non-Magnetic Powder)

Details of the non-magnetic layer are explained below.

The magnetic recording medium of the present invention may have the non-magnetic layer (lower layer) comprising a binder and a non-magnetic powder above the non-magnetic support provided with the radiation-cured material layer.

The non-magnetic layer may employ a magnetic powder as long as the lower layer is substantially non-magnetic, but preferably employs a non-magnetic powder.

The non-magnetic powder that can be used in the non-magnetic layer may be an inorganic substance or an organic substance. It is also possible to use carbon black, etc. Examples of the inorganic substance include a metal, a metal oxide, a metal carbonate, a metal sulfate, a metal nitride, a metal carbide, and a metal sulfide.

Specific examples thereof include a titanium oxide such as titanium dioxide, cerium oxide, tin oxide, tungsten oxide, ZnO, $ZrO_2$, $SiO_2$, $Cr_2O_3$, α-alumina having an a-component proportion of 90% to 100%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide, and they can be used singly or in a combination of two or more types. α-Iron oxide or a titanium oxide is preferable.

The form of the non-magnetic powder may be any one of acicular, spherical, polyhedral, and tabular.

The crystallite size of the non-magnetic powder is preferably 4 nm to 1 μm, and more preferably 40 to 100 nm. It is preferable if the crystallite size is in the range of 4 nm to 1 μm since there are no problems with dispersion and a suitable surface roughness is obtained.

The average particle size of these non-magnetic powders is preferably 5 nm to 2 μm, but it is possible to combine non-magnetic powders having different average particle sizes as necessary, or widen the particle size distribution of a single non-magnetic powder, thus producing the same effect. The average particle size of the non-magnetic powder is particularly preferably 10 to 200 nm. It is preferable if it is in the range of 5 nm to 2 μm, since good dispersibility and a suitable surface roughness can be obtained.

The specific surface area ($S_{BET}$), by the BET method, of the non-magnetic powder is preferably 1 to 100 $m^2/g$, more preferably 5 to 70 $m^2/g$, and yet more preferably 10 to 65 $m^2/g$. It is preferable if the specific surface area is in the range of 1 to 100 $m^2/g$, since a suitable surface roughness can be obtained, and dispersion can be carried out using a desired amount of binder.

The oil absorption using dibutyl phthalate (DBP) (DBP oil absorption) is preferably 5 to 100 mL/100 g, more preferably 10 to 80 mL/100 g, and yet more preferably 20 to 60 mL/100 g.

The specific gravity is preferably 1 to 12, and more preferably 3 to 6. The tap density is preferably 0.05 to 2 g/mL, and more preferably 0.2 to 1.5 g/mL. When the tap density is in the range of 0.05 to 2 g/mL, there is little scattering of particles, the operation is easy, and there tends to be little sticking to equipment.

The pH of the non-magnetic powder is preferably 2 to 11, and particularly preferably 6 to 9. When the pH is in the range of 2 to 11, the coefficient of friction does not increase as a result of high temperature and high humidity or release of a fatty acid.

The water content of the non-magnetic powder is preferably 0.1 to 5 wt %, more preferably 0.2 to 3 wt %, and yet more preferably 0.3 to 1.5 wt %. It is preferable if the water content is in the range of 0.1 to 5 wt %, since dispersion is good, and the viscosity of a dispersed coating solution becomes stable.

The ignition loss is preferably 20 wt % or less, and a small ignition loss is preferable.

When the non-magnetic powder is an inorganic powder, the Mohs hardness thereof is preferably in the range of 4 to 10. When the Mohs hardness is in the range of 4 to 10, it is possible to guarantee the durability. The amount of stearic acid absorbed by the non-magnetic powder is preferably 1 to 20 $\mu mol/m^2$, and more preferably 2 to 15 $\mu mol/m^2$.

The heat of wetting of the non-magnetic powder in water at 25° C. is preferably in the range of 20 to 60 $\mu J/cm^2$ (200 to 600 $erg/cm^2$). It is possible to use a solvent that gives a heat of wetting in this range.

The number of water molecules on the surface at 100° C. to 400° C. is suitably 1 to 10/100 Å. The pH at the isoelectric point in water is preferably between 3 and 9.

The surface of the non-magnetic powder is preferably subjected to a surface treatment with $Al_2O_3$, $SiO_2$, $TiO_2$, $ZrO_2$, $SnO_2$, $Sb_2O_3$, or ZnO. In terms of dispersibility in particular, $Al_2O_3$, $SiO_2$, $TiO_2$, and $ZrO_2$ are preferable, and $Al_2O_3$, $SiO_2$, and $ZrO_2$ are more preferable. They may be used in combination or singly. Depending on the intended purpose, a surface-treated layer may be obtained by co-preprecipitation, or a method can be employed in which the surface is firstly treated with alumina and the surface thereof is then treated with silica, or vice versa. The surface-treated layer may be formed as a porous layer depending on the intended purpose, but it is generally preferable for it to be uniform and dense.

Specific examples of the non-magnetic powder used in the non-magnetic layer of the present invention include Nanotite (manufactured by Showa Denko K. K.), HIT-100 and ZA-G1 (manufactured by Sumitomo Chemical Co., Ltd.), DPN-250, DPN-250BX, DPN-245, DPN-270BX, DPB-550BX, and DPN-550RX (manufactured by Toda Kogyo Corp.), titanium oxide TTO-51B, TTO-55A, TTO-55B, TTO-55C, TTO-55S, TTO-55D, and SN-100, MJ-7, α-iron oxide E270, E271, and E300 (manufactured by Ishihara Sangyo Kaisha Ltd.), STT-4D, STT-30D, STT-30, and STT-65C (manufactured by Titan Kogyo Kabushiki Kaisha), MT-100S, MT-100T, MT-150W, MT-500B, MT-600B, MT-100F, and MT-500HD (manufactured by Tayca Corporation), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and TiO2P25 (manufactured by Nippon Aerosil Co., Ltd.), 100A, and 500A (manufactured by Ube Industries, Ltd.), Y-LOP (manufactured by Titan Kogyo Kabushiki Kaisha), and calcined products thereof. Particularly preferred non-magnetic powders are titanium dioxide and α-iron oxide.

By mixing carbon black with the non-magnetic powder, the surface electrical resistance of the non-magnetic layer can be reduced, the light transmittance can be decreased, and a desired μVickers hardness can be obtained. The μVickers hardness of the non-magnetic layer is usually 25 to 60 $kg/mm^2$, and is preferably 30 to 50 $kg/mm^2$ in order to adjust the head contact, and can be measured using a thin film hardness meter (HMA-400 manufactured by NEC Corporation) with, as an indentor tip, a triangular pyramidal diamond needle having a tip angle of 80° and a tip radius of 0.1 μm. The light transmittance is generally standardized such that the absorption of infrared rays having a wavelength of on the order of 900 nm is 3% or less and, in the case of, for example, VHS magnetic tapes, 0.8% or less. Because of this, furnace black for rubber, thermal black for rubber, carbon black for coloring, acetylene black, etc. can be used.

The specific surface area of the carbon black used in the non-magnetic layer of the present invention is preferably 100 to 500 $m^2/g$, and more preferably 150 to 400 $m^2/g$, and the DBP oil absorption thereof is preferably 20 to 400 mL/100 g, and more preferably 30 to 200 mL/100 g. The average particle size of the carbon black is preferably 5 to 80 nm, more preferably 10 to 50 nm, and yet more preferably 10 to 40 nm. The pH of the carbon black is preferably 2 to 10, the water content thereof is preferably 0.1% to 10%, and the tap density is preferably 0.1 to 1 g/mL.

Specific examples of the carbon black that can be used in the non-magnetic layer of the present invention include BLACKPEARLS 2000, 1300, 1000, 900, 800, 880 and 700, and VULCAN XC-72 (manufactured by Cabot Corporation), #3050B, #3150B, #3250B, #3750B, #3950B, #950, #650B, #970B, #850B, and MA-600 (manufactured by Mitsubishi Chemical Corporation), CONDUCTEX SC, RAVEN 8800, 8000, 7000, 5750, 5250, 3500, 2100, 2000, 1800, 1500, 1255 and 1250 (manufactured by Columbian Carbon Co.), and Ketjen Black EC (manufactured by Akzo Nobel).

The carbon black may be subjected to any of a surface treatment with a dispersant, etc., grafting with a resin, or a partial surface graphitization. Prior to adding carbon black to a coating solution, the carbon black may be predispersed with a binder. These carbon blacks can be used in a range that does not exceed 50 wt % of the above-mentioned inorganic powder and in a range that does not exceed 40 wt % of the total weight of the non-magnetic layer. These types of carbon black may be used singly or in combination. The carbon black that can be used in the non-magnetic layer of the present invention can be selected by referring to, for example, the 'Kabon Burakku Binran' (Carbon Black Handbook) (edited by the Carbon Black Association of Japan).

It is also possible to add an organic powder to the non-magnetic layer, depending on the intended purpose. Examples of such an organic powder include an acrylic styrene resin powder, a benzoguanamine resin powder, a melamine resin powder, and a phthalocyanine pigment, but a polyolefin resin powder, a polyester resin powder, a polyamide resin powder, a polyimide resin powder, and a polyfluoroethylene resin can also be used. Production methods such as those described in JP-A62-18564 and JP-A-60-255827 can be used.

IV. Non-Magnetic Support

With regard to the non-magnetic support that can be used in the present invention, known biaxially stretched films such as polyethylene terephthalate, polyethylene naphthalate, polyamide, polyamideimide, and aromatic polyamide can be used. Polyethylene terephthalate, polyethylene naphthalate, and polyamide are preferred.

These supports can be subjected in advance to a corona discharge treatment, a plasma treatment, a treatment for enhancing adhesion, a thermal treatment, etc. The non-magnetic support that can be used in the present invention preferably has a surface smoothness such that its center plane average roughness Ra is in the range of 3 to 10 nm for a cutoff value of 0.25 mm. In the present invention, "center plane average roughness" has the same meaning as "center plane surface roughness", "center average surface roughness" or "center plane average surface roughness".

V. Backcoat Layer

In general, there is a strong requirement for magnetic tapes for recording computer data to have better repetitive transport properties than video tapes and audio tapes. In order to maintain such high storage stability, a backcoat layer can be provided on the surface of the non-magnetic support opposite to the surface where the non-magnetic layer and the magnetic layer are provided. As a coating solution for the backcoat layer, a binder and a particulate component such as an abrasive or an antistatic agent are dispersed in an organic solvent. As a granular component, various types of inorganic pigment or carbon black can be used. As the binder, a resin such as nitrocellulose, a phenoxy resin, a vinyl chloride resin, or a polyurethane can be used singly or in combination.

VI. Layer Arrangement

The layer arrangement of the magnetic recording medium used in the present invention has, as essential constituents above the non-magnetic support, the radiation-cured material layer and the magnetic layer, in that order. The undercoat layer may be provided between the non-magnetic support and the radiation-cured material layer as necessary, and the non-magnetic layer may be provided between the radiation-cured material layer and the magnetic layer.

In the constitution of the magnetic recording medium used in the present invention, the thickness of the radiation-cured material layer is preferably in the range of 0.1 to 1.0 µm, more preferably 0.2 to 0.8 µm, and yet more preferably 0.3 to 0.6 µm as described above. The thickness of the non-magnetic support is preferably 3 to 80 µm. When the undercoat layer is provided between the non-magnetic support and the radiation-cured material layer, the thickness of the undercoat layer is preferably 0.01 to 0.8 µm, and more preferably 0.02 to 0.6 µm. The thickness of the backcoat layer provided on the surface of the non-magnetic support opposite to the surface where the non-magnetic layer and the magnetic layer are provided is preferably 0.1 to 1.0 µm, and more preferably 0.2 to 0.8 µm.

The thickness of the magnetic layer is optimized according to the saturation magnetization and the head gap of the magnetic head and the bandwidth of the recording signal, but it is generally 0.01 to 0.10 µm, preferably 0.02 to 0.5 µm, and more preferably 0.03 to 0.15 µm. The percentage variation in thickness of the magnetic layer is preferably ±50% or less, and more preferably ±40% or less. The magnetic layer can be at least one layer, but it is also possible to provide two or more separate layers having different magnetic properties, and a known configuration for a multilayer magnetic layer can be employed.

The thickness of the non-magnetic layer of the present invention is preferably 0.2 to 3.0 µm, more preferably 0.3 to 2.5 µm, and yet more preferably 0.4 to 2.0 µm. The non-magnetic layer of the magnetic recording medium of the present invention exhibits its effect if it is substantially non-magnetic, but even if it contains a small amount of a magnetic substance as an impurity or intentionally, if the effects of the present invention are exhibited the constitution can be considered to be substantially the same as that of the magnetic recording medium of the present invention. 'Substantially the same' referred to here means that the non-magnetic layer has a residual magnetic flux density of 10 mT (100 G) or less or a coercive force of 7.96 kA/m (100 Oe) or less, and preferably has no residual magnetic flux density and no coercive force.

VII. Production Method

A process for producing a magnetic layer coating solution for the magnetic recording medium used in the present invention comprises at least a kneading step, a dispersing step and, optionally, a blending step that is carried out prior to and/or subsequent to the above-mentioned steps. Each of these steps may be composed of two or more separate stages. All materials, including the ferromagnetic hexagonal ferrite powder or the ferromagnetic metal powder, the non-magnetic powder, the binder, the carbon black, the abrasive, the antistatic agent, the lubricant, and the solvent used in the present invention, may be added in any step from the beginning or during the course of the step. The addition of each material may be divided across two or more steps. For example, a polyurethane can be divided and added in a kneading step, a dispersing step, and a blending step for adjusting the viscosity after dispersion. To attain the object of the present invention, a conventionally known production technique may be employed as a part of the steps. In the kneading step, it is preferable to use a powerful kneading machine such as an open kneader, a continuous kneader, a pressure kneader, or an extruder. When a kneader is used, all or a part of the binder (preferably 30 wt % or above of the entire binder) is preferably kneaded with the fine ferromagnetic powder or the non-magnetic powder at 15 to 500 parts by weight of the binder relative to 100 parts by weight of the fine ferromagnetic powder. Details of these kneading treatments are described in JP-A-1-106338 and JP-A-1-79274. For the dispersion of the magnetic layer solution and a non-magnetic layer solution, glass beads can be used. As such glass beads, a dispersing medium having a high specific gravity such as zirconia beads, titania beads, or steel beads is suitably used. An optimal particle size and packing density of these dispersing media is used. A known disperser can be used.

The process for producing the magnetic recording medium of the present invention includes, for example, coating the surface of a moving non-magnetic support with a magnetic layer coating solution so as to give a predetermined coating thickness. A plurality of magnetic layer coating solutions can be applied successively or simultaneously in multilayer coating, and a lower magnetic layer coating solution and an upper magnetic layer coating solution can also be applied successively or simultaneously in multilayer coating. As coating equipment for applying the above-mentioned magnetic layer coating solution or the lower magnetic layer coating solution, an air doctor coater, a blade coater, a rod coater, an extrusion coater, an air knife coater, a squeegee coater, a dip coater, a reverse roll coater, a transfer roll coater, a gravure coater, a kiss coater, a cast coater, a spray coater, a spin coater, etc. can be used. With regard to these, for example, 'Saishin Kotingu Gijutsu' (Latest Coating Technology) (May 31, 1983) published by Sogo Gijutsu Center can be referred to.

In the case of a magnetic tape, the coated layer of the magnetic layer coating solution is subjected to a magnetic field alignment treatment in which the fine ferromagnetic powder contained in the coated layer of the magnetic layer coating solution is aligned in the longitudinal direction using a cobalt magnet or a solenoid. In the case of a disk, although sufficient isotropic alignment can sometimes be obtained without using an alignment device, it is preferable to employ a known random alignment device such as, for example, arranging obliquely alternating cobalt magnets or applying an alternating magnetic field with a solenoid. The isotropic alignment referred to here means that, in the case of a fine ferromagnetic metal powder, in general, in-plane two-dimensional random is preferable, but it can be three-dimensional random by introducing a vertical component. In the case of a ferromagnetic hexagonal ferrite powder, in general, it tends to be in-plane and vertical three-dimensional random, but in-plane two-dimensional random is also possible. By using a known method such as magnets having different poles facing each other so as to make vertical alignment, circumferentially isotropic magnetic properties can be introduced. In particular, when carrying out high density recording, vertical alignment is preferable. Furthermore, circumferential alignment may be employed using spin coating.

It is preferable for the drying position for the coating to be controlled by controlling the drying temperature and blowing rate and the coating speed; it is preferable for the coating speed to be 20 m/min to 1,000 m/min and the temperature of drying air to be 60° C. or higher, and an appropriate level of pre-drying may be carried out prior to entering a magnet zone.

After drying is carried out, the coated layer is subjected to a surface smoothing treatment. The surface smoothing treatment employs, for example, super calender rolls, etc. By carrying out the surface smoothing treatment, cavities formed by removal of the solvent during drying are eliminated, thereby increasing the packing ratio of the fine ferromagnetic powder in the magnetic layer, and a magnetic recording medium having high electromagnetic conversion characteristics can thus be obtained.

With regard to calendering rolls, rolls of a heat-resistant plastic such as epoxy, polyimide, polyamide, or polyamide-imide are used. It is also possible to treat with metal rolls. The magnetic recording medium of the present invention preferably has a surface center plane average roughness in the range of 0.1 to 4.0 nm for a cutoff value of 0.25 mm, and more preferably 0.5 to 3.0 nm, which is extremely smooth. As a method therefor, a magnetic layer formed by selecting a specific fine ferromagnetic powder and binder as described above is subjected to the above-mentioned calendering treatment. With regard to calendering conditions, the calender roll temperature is in the range of 60° C. to 100° C., preferably in the range of 70° C. to 100° C., and particularly preferably in the range of 80° C. to 100° C., and the pressure is in the range of 100 to 500 kg/cm, preferably in the range of 200 to 450 kg/cm, and particularly preferably in the range of 300 to 400 kg/cm.

As thermal shrinkage reducing means, there is a method in which a web is thermally treated while handling it with low tension, and a method (thermal treatment) involving thermal treatment of a tape when it is in a layered configuration such as in bulk or installed in a cassette, and either can be used. In the former method, the effect of the imprint of projections of the surface of the backcoat layer is small, but the thermal shrinkage cannot be greatly reduced. On the other hand, the latter thermal treatment can improve the thermal shrinkage greatly, but since the effect of the imprint of projections of the surface of the backcoat layer is strong, the surface of the magnetic layer is roughened, and this causes the output to decrease and the noise to increase. In particular, a high output and low noise magnetic recording medium can be obtained from the magnetic recording medium having no projections on the surface of the backcoat layer accompanying the thermal treatment. The magnetic recording medium thus obtained can be cut to a desired size using a cutter, a stamper, etc. before use.

VIII. Physical Properties

The saturation magnetic flux density of the magnetic layer of the magnetic recording medium used in the present invention is 100 to 300 mT (1,000 to 3,000 G). The coercive force (Hc) of the magnetic layer is preferably 143 to 318 kA/m (1,800 to 4,000 Oe), and more preferably 159 to 279 kA/m (2,000 to 3,500 Oe). It is preferable for the coercive force distribution to be narrow, and the SFD and SFDr are preferably 0.6 or less, and more preferably 0.2 or less.

The coefficient of friction, with respect to a head, of the magnetic recording medium used in the present invention is 0.5 or less at a temperature of −10° C. to 40° C. and a humidity of 0% to 95%, and preferably 0.3 or less. The electrostatic potential is preferably −500 V to +500 V. The modulus of elasticity of the magnetic layer at an elongation of 0.5% is preferably 0.98 to 19.6 GPa (100 to 2,000 Kg/mm$^2$) in each direction within the plane, and the breaking strength is preferably 98 to 686 MPa (10 to 70 Kg/mm$^2$); the modulus of elasticity of the magnetic recording medium is preferably 0.98 to 14.7 GPa (100 to 1,500 Kg/mm$^2$) in each direction within the plane, the residual elongation is preferably 0.5% or less, and the thermal shrinkage at any temperature up to and including 100° C. is preferably 1% or less, more preferably 0.5% or less, and most preferably 0.1% or less.

The glass transition temperature of the magnetic layer (the maximum point of the loss modulus in a dynamic viscoelasticity measurement at 110 Hz) is preferably 50° C. to 180° C., and that of the non-magnetic layer is preferably 0° C. to 180° C. The loss modulus is preferably in the range of $1 \times 10^7$ to $8 \times 10^8$ Pa ($1 \times 10^8$ to $8 \times 10^9$ dyne/cm$^2$), and the loss tangent is preferably 0.2 or less. When the loss tangent is too large, the problem of tackiness easily occurs. These thermal properties and mechanical properties are preferably substantially identical to within 10% in each direction in the plane of the medium.

The residual solvent in the magnetic layer is preferably 100 mg/m$^2$ or less, and more preferably 10 mg/m$^2$ or less. The porosity of the coating layer is preferably 30 vol % or less for both the non-magnetic layer and the magnetic layer, and more preferably 20 vol % or less. In order to achieve a high output, the porosity is preferably small, but there are cases in which a certain value should be maintained depending on the intended purpose. For example, in the case of disk media where repetitive use is considered to be important, a large porosity is often preferable from the point of view of storage stability.

The center plane average roughness Ra of the magnetic layer is 4.0 nm or less, preferably 3.0 nm or less, and more preferably 2.0 nm or less, when measured using a TOPO-3D digital optical profiler (manufactured by Wyko Corporation). The maximum height $SR_{max}$ of the magnetic layer is preferably 0.5 μm or less, the ten-point average roughness SRz is 0.3 μm or less, the center plane peak height SRp is 0.3 μm or less, the center plane valley depth SRv is 0.3 μm or less, the center plane area factor SSr is 20% to 80%, and the average wavelength Sλa is 5 to 300 μm. It is possible to set the number of surface projections on the magnetic layer having a size of 0.01 to 1 μm at any level in the range of 0 to 2,000 projections per 100 (μm)$^2$, and by so doing the electromagnetic conversion characteristics and the coefficient of friction can be optimized, which is preferable. They can be controlled easily by controlling the surface properties of the support by means of a filler, the particle size and the amount of a powder added to the magnetic layer, and the shape of the roll surface in the calendering process. The curl is preferably within ±3 mm.

When the magnetic recording medium has a non-magnetic layer and a magnetic layer, it can easily be anticipated that the physical properties of the non-magnetic layer and the magnetic layer can be varied according to the intended purpose. For example, the elastic modulus of the magnetic layer can be made high, thereby improving the storage stability, and at the same time the elastic modulus of the non-magnetic layer can be made lower than that of the magnetic layer, thereby improving the head contact of the magnetic recording medium.

A head used for playback of signals recorded magnetically on the magnetic recording medium of the present invention is not particularly limited, but an MR head is preferably used. When an MR head is used for playback of the magnetic recording medium of the present invention, the MR head is not particularly limited and, for example, a GMR head or a TMR head can be used. A head used for magnetic recording is not particularly limited, but the saturation magnetization is 1.0 T or more, and preferably 1.5 T or more.

In the present invention, projections on the surface of polyethylene terephthalate, polyethylene naphthalate, polyamide, etc. supports, which are generally known as supports for magnetic recording media, can be buried by providing, on the non-magnetic support, the radiation-cured material layer and then the non-magnetic layer or the magnetic layer, the radiation-cured material layer containing as a radiation curable compound comprising a compound having one or more ether groups and three or more radiation curable functional groups per molecule. In particular, micro projections originating from fillers contained in the support, which are thought to have a large effect on the electromagnetic conversion characteristics, can be eliminated, and micro projections of the non-magnetic layer and the magnetic layer can be reduced. As a result, an extremely smooth magnetic recording medium can be obtained, and excellent electromagnetic conversion characteristics can be achieved.

It can be expected that, since the viscosity of the coating solution (prior to drying; prior to exposure to radiation) for forming the radiation-cured material layer in the present invention is comparatively low, its leveling properties during coating will be excellent, and the effect in burying projections on the surface of the support will be large.

Furthermore, since the compound forming such a radiation-cured material layer has three or more radiation curable functional groups, the cross-linking density of the coating can be enhanced, and a coating strength such that faults such as sticking to a path roller, etc. in a coating step are avoided can be obtained.

Moreover, since the amounts of uncured monomer components are very small, no monomer precipitates on the surface of the magnetic layer during long-term storage, and a magnetic recording medium having excellent storage stability can be obtained.

Furthermore, since the radiation curable compound of the present invention has one or more ether groups per molecule, there is an effect of enhancing the adhesion of the magnetic layer. It is surmised that this is because the ether group can impart an appropriate level of extensibility to the radiation-cured material layer and the polarity of the ether group can improve the adhesive power.

EXAMPLES

The present invention is explained below more specifically with reference to examples. 'Parts' in the examples denotes 'parts by weight' unless otherwise specified.

Example 1

Preparation of Magnetic Coating Solution

| A ferromagnetic alloy powder | 100 parts |
| --- | --- |

(composition: Fe 89 atm %, Co 5 atm %, Y 6 atm %; Hc 159 kA/m (2,000 Oe); crystallite size 15 nm; $S_{BET}$ 59 m$^2$/g;

major axis length 0.04 pm; acicular ratio 7; σs 150 A·m²/kg (emu/g)) was ground in an open kneader for 10 minutes, and then kneaded for 60 minutes with an SO$_3$Na-containing polyurethane solution 10 parts (solids content) (solids content 30%; SO$_3$Na content 70 µeq/g; weight-average molecular weight 40,000) and

| | |
|---|---|
| cyclohexanone | 30 parts |
| following which | |
| an abrasive (Al$_2$O$_3$, particle size 0.3 µm) | 2 parts |
| carbon black (particle size 40 µm) | 2 parts, and |
| methyl ethyl ketone/toluene = 1/1 | 200 parts | were added, and the mixture was dispersed in a sand mill for 120 minutes. To this were added

| | |
|---|---|
| butyl stearate | 2 parts |
| stearic acid | 1 part, and |
| methyl ethyl ketone | 50 parts, | and after stirring the mixture for a further 20 minutes, it was filtered using a filter having an average pore size of 1 µm to give a magnetic coating solution.

A surface of a 7 µm thick polyethylene terephthalate support having a center plane average roughness Ra of 6.2 nm was coated by means of a wire-wound bar with a 30 wt % MEK (methyl ethyl ketone) solution of the radiation curable compound shown in Table 1 so that the dry thickness would be 0.5 µm and dried, and the coated surface was then cured by irradiation with an electron beam at an acceleration voltage of 150 kV so as to give an absorbed dose of 5 Mrad.

The magnetic coating solution obtained above was then applied on the radiation-cured material layer by means of reverse roll so that the dry thickness would be 0.5 µm. Before the magnetic coating solution had dried, it was subjected to magnetic field alignment using a 5,000 G Co magnet and a 4,000 G solenoid magnet, the solvent was dried off, and the coating was then subjected to a calender treatment employing a metal roll-metal roll-metal roll-metal roll-metal roll-metal roll-metal roll combination (speed 100 m/min, line pressure 300 kg/cm, temperature 90° C.) and then slit to a width of 1/2 inch to give a magnetic tape.

Examples 2 to 5 and Comparative Examples 1 to 5

Magnetic tapes were prepared in the same manner as in Example 1 except that the radiation curable compounds shown in Table 1 were used.

Examples 6 to 10 and Comparative Examples 6 to 10

Preparation of magnetic coating solution: prepared in the same manner as in Example 1.

| Preparation of non-magnetic coating solution | |
|---|---|
| α-Fe$_2$O$_3$ (average particle size 0.15 µm; S$_{BET}$ 52 m²/g; surface treatment with Al$_2$O$_3$ and SiO$_2$; pH 6.5 to 8.0) | 100 parts |

| Preparation of non-magnetic coating solution -continued | |
|---|---|
| was ground in an open kneader for 10 minutes, and then kneaded for 60 minutes with | |
| an SO$_3$Na-containing polyurethane solution (solids content 30%; SO$_3$Na content 70 µeq/g; weight-average molecular weight 40,000) and | 15 parts (solids content) |
| cyclohexanone | 30 parts, |
| following which | |
| methyl ethyl ketone/cyclohexanone = 6/4 | 200 parts |
| was added, and the mixture was dispersed in a sand mill for 120 minutes. To this were added | |
| butyl stearate | 2 parts |
| stearic acid | 1 part, and |
| methyl ethyl ketone | 50 parts, | and after stirring the mixture for a further 20 minutes, it was filtered using a filter having an average pore size of 1 µm to give a non-magnetic coating solution.

A surface of a 7 µm thick polyethylene terephthalate support having a center plane average roughness Ra of 6.2 nm was coated by means of a wire-wound bar with a 30 wt % MEK solution of the radiation curable compound shown in Table 1 so that the dry thickness would be 0.5 µm and dried, and the coated surface was then cured by irradiation with an electron beam at an acceleration voltage of 150 kV so as to give an absorbed dose of 5 Mrad.

Using reverse roll simultaneous multilayer coating, the non-magnetic coating solution obtained above was applied to the radiation-cured material layer so that the dry thickness would be 1.5 µm, followed by the upper layer magnetic coating solution, which was applied so that the dry thickness would be 0.1 µm. Before the magnetic coating solution had dried, it was subjected to magnetic field alignment using a 5,000 G Co magnet and a 4,000 G solenoid magnet, the solvent was dried off, and the coating was then subjected to a calender treatment employing a metal roll-metal roll-metal roll-metal roll-metal roll-metal roll-metal roll combination (speed 100 m/min, line pressure 300 kg/cm, temperature 90° C.) and then slit to a width of ½ inch to give a magnetic tape.

Compounds (F) to (J) used in the Comparative Examples are shown below.

Compound (F)

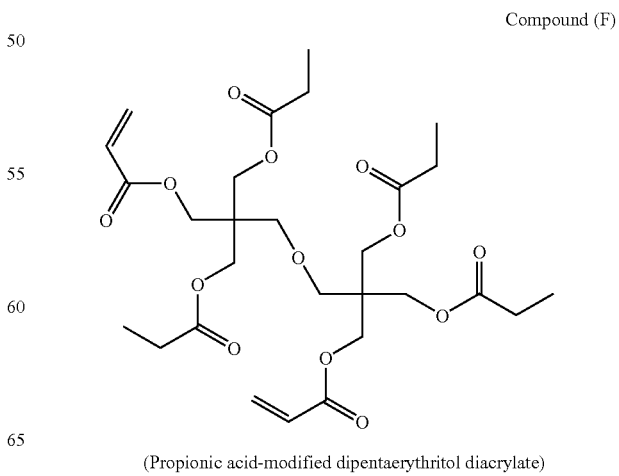

(Propionic acid-modified dipentaerythritol diacrylate)

-continued

Compound (G)

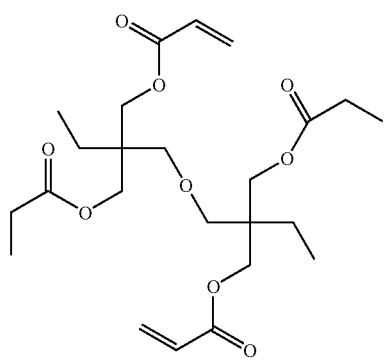

(Propionic acid-modified ditrimethylolpropane diacrylate)

Compound (H)

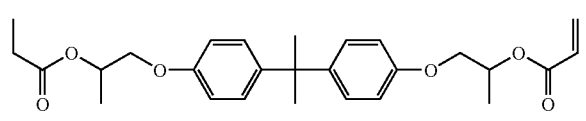

(Bisphenol A propylene oxide adduct diacrylate)

Compound (I)

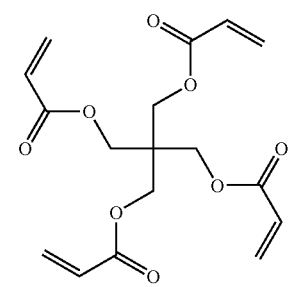

(Pentaerythritol tetraacrylate)

Compound (J)

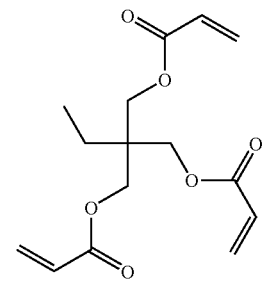

(Trimethylolpropane triacrylate)

Measurement Methods

1. Number of Micro Projections

The number of projections per 10 μm square (100 (μm)$^2$) was measured at every 5 nm up to a height of 20 nm using a Nanoscope III (AFM: atomic force microscope) manufactured by Digital Instruments with a four-sided pyramidal SiN probe having a tip angle of 70°.

2. Electromagnetic Conversion Characteristics

Measurement was carried out by mounting a recording head (MIG gap 0.15 μm, 1.8 T) and an MR playback head on a drum tester.

The playback output was measured at a speed of the medium relative to the head of 1 to 3 m/min and a surface recording density of 0.57 Gbit/(inch)$^2$. The playback output was expressed as a relative value where the playback output of Comparative Example 1 was 0 dB.

3. Adhesion

A pressure-sensitive adhesive tape was affixed to the surface of the magnetic layer and peeled off at 180 degrees; when the magnetic layer was not peeled off, it was evaluated as excellent, when there was some magnetic layer remaining on a sample although the magnetic layer peeled off, it was evaluated as good, and when there was no magnetic layer remaining on a sample, it was evaluated as poor.

4. Repetitive Transport Properties

A sample was run repeatedly at 14 mm/sec for 800 passes at 50° C. and 20% RH with the magnetic layer surface in contact with an SUS 420 member while applying a load of 100 g, and the magnetic layer surface and the member were inspected using a differential interference optical microscope and evaluated using the ranking below.

Excellent: no scratches on the magnetic layer, and no debris on the member from the magnetic layer.

Good: some scratches on the magnetic layer, but no debris on the member from the magnetic layer.

Poor: some scratches on the magnetic layer, and some debris on the member from the magnetic layer.

The evaluation results for the properties of the magnetic tapes of Examples 1 to 10 and the magnetic tapes of Comparative Examples 1 to 10 are given in Table 1.

TABLE 1

| | Radiation-cured material layer | | Number of micro projections (counts) | Electromagnetic conversion characteristics (dB) | Adhesion | Repetitive transport properties |
|---|---|---|---|---|---|---|
| Example 1 | Compound A | Dipentaerythritol hexaacrylate | 880 | 0.4 | Excellent | Excellent |
| Example 2 | Compound B | Propionic acid-modified dipentaerythritol tetraacrylate | 530 | 0.6 | Excellent | Excellent |
| Example 3 | Compound C | Propionic acid-modified dipentaerythritol triacrylate | 430 | 0.6 | Excellent | Excellent |
| Example 4 | Compound D | Ditrimethylolpropane tetraacrylate | 410 | 0.8 | Excellent | Excellent |
| Example 5 | Compound E | Caprolactone-modified dipentaerythritol hexaacrylate | 820 | 0.4 | Excellent | Excellent |
| Example 6 | Compound A | Dipentaerythritol hexaacrylate | 50 | 1.1 | Excellent | Excellent |
| Example 7 | Compound B | Propionic acid-modified dipentaerythritol tetraacrylate | 25 | 1.5 | Excellent | Excellent |
| Example 8 | Compound C | Propionic acid-modified dipentaerythritol triacrylate | 5 | 1.8 | Excellent | Excellent |

TABLE 1-continued

|  |  | Radiation-cured material layer | Number of micro projections (counts) | Electromagnetic conversion characteristics (dB) | Adhesion | Repetitive transport properties |
|---|---|---|---|---|---|---|
| Example 9 | Compound D | Ditrimethylolpropane tetraacrylate | 12 | 1.6 | Excellent | Excellent |
| Example 10 | Compound E | Caprolactone-modified dipentaerythritol hexaacrylate | 30 | 1.2 | Excellent | Excellent |
| Comp. Ex. 1 | Compound F | Propionic acid-modified dipentaerythritol diacrylate | 1050 | 0 | Good | Poor |
| Comp. Ex. 2 | Compound G | Propionic acid-modified ditrimethylolpropane diacrylate | 930 | 0.1 | Good | Poor |
| Comp. Ex. 3 | Compound H | Bisphenol A propylene oxide adduct diacrylate | 1300 | −0.5 | Poor | Poor |
| Comp. Ex. 4 | Compound I | Pentaerythritol tetraacrylate | 1400 | −0.4 | Poor | Good |
| Comp. Ex. 5 | Compound J | Trimethylolpropane triacrylate | 1400 | −0.4 | Poor | Good |
| Comp. Ex. 6 | Compound F | Propionic acid-modified dipentaerythritol diacrylate | 560 | 0.3 | Good | Poor |
| Comp. Ex. 7 | Compound G | Propionic acid-modified ditrimethylolpropane diacrylate | 530 | 0.3 | Good | Poor |
| Comp. Ex. 8 | Compound H | Bisphenol A ethylene oxide adduct diacrylate | 1010 | −0.2 | Poor | Poor |
| Comp. Ex. 9 | Compound I | Pentaerythritol tetraacrylate | 1050 | −0.3 | Poor | Good |
| Comp. Ex. 10 | Compound J | Trimethylolpropane triacrylate | 1100 | −0.4 | Poor | Good |

What is claimed is:

1. A magnetic recording medium comprising:
a non-magnetic support and, in order, above the non-magnetic support;
a radiation-cured material layer cured by exposing a layer consisting essentially of a radiation curable compound to radiation;
a non-magnetic layer comprising a non-magnetic powder and a binder; and
a magnetic layer comprising a ferromagnetic powder and a binder;
the radiation curable compound comprising a compound having one or more ether groups and three or more radiation curable functional groups per molecule; and
the number of magnetic layer surface micro projections having a height measured by atomic force microscopy (AFM) of 10 to 20 nm being 5 to 1,000 per 100 $(\mu m)^2$;
wherein the radiation-cured material layer has a thickness of 0.2 to 0.8 μm,
the radiation curable compound has no cyclic structure,
the radiation curable functional group is a (meth)acrylic acid residue,
the radiation curable compound has 3 to 6 (meth)acrylic acid residues per molecule,
the radiation curable compound has 1 to 3 ether groups per molecule, and
the radiation curable compound is selected from the group consisting of dipentaerythritol hexaacrylate, a propionic acid-modified dipentaerythritol tetraacrylate, a propionic acid-modified dipentaerythritol triacrylate, ditrimethylolpropane tetraacrylate, and a caprolactone-modified dipentaerythritol hexaacrylate.

2. The magnetic recording medium according to claim 1, wherein the radiation-cured material layer has a thickness of 0.3 to 0.6 μm.

3. The magnetic recording medium according to claim 1, wherein there are 5 to 100 magnetic layer surface micro projections per 100 $(\mu m)^2$ having a height, measured by atomic force microscopy (AFM), of 10 to 20 nm.

4. The magnetic recording medium according to claim 1, wherein the ferromagnetic powder is a ferromagnetic alloy powder having a major axis length of 20 to 50 nm.

5. The magnetic recording medium according to claim 1, wherein the binder in the magnetic layer is selected from the group consisting of a polyurethane resin, an acrylic resin, a cellulose resin, and a vinyl chloride resin.

6. The magnetic recording medium according to claim 1, wherein the non-magnetic powder is selected from the group consisting of a metal, a metal oxide, a metal carbonate, a metal sulfate, a metal nitride, a metal carbide, and a metal sulfide.

7. The magnetic recording medium according to claim 1, wherein the non-magnetic support is selected from the group consisting of polyethylene terephthalate, polyethylene naphthalate, and polyamide.

8. The magnetic recording medium according to claim 1, wherein the non-magnetic support has a center plane average roughness of 3 to 10 nm for a cutoff value of 0.25 mm.

9. The magnetic recording medium according to claim 1, wherein the ferromagnetic powder is an acicular ferromagnetic metal powder having a crystallite size of 4 nm to 1 μm and a major axis length of 10 to 100 nm.

10. The magnetic recording medium according to claim 1, wherein the binder in the non-magnetic layer is selected from the group consisting of a polyurethane resin, an acrylic resin, a cellulose resin, and a vinyl chloride resin.

* * * * *